United States Patent Office
3,347,947
Patented Oct. 17, 1967

1

3,347,947
INHIBITION OF CORROSION DURING CATALYTIC REACTIONS

Robert T. Adams, Lafayette, Calif., assignor to Chevron Research Company, a corporation of Delaware No Drawing. Filed May 27, 1965, Ser. No. 459,438
4 Claims. (Cl. 260—671)

The present invention relates to the inhibition of corrosion during catalytic hydrocarbon conversion reactions such as alkylation, carried out in the presence of preformed liquid red oil catalyst obtained by means of the Friedel-Crafts reaction.

It is known that the alkylation of hydrocarbons, particularly aromatic hydrocarbons by means of the Friedel-Crafts reaction using aluminum chloride or aluminum bromide, is accompanied by the formation of highly colored hydrocarbon-insoluble oils, varying from dark red to brown, known as "red oils." These red oil catalysts, or metallic halide-hydrocarbon complexes, have marked catalyst activity. A more detailed description of the nature of these red oils and of their catalytic activity is given in the literature, for example, U.S. Patents 2,398,563; 2,419,632, and in the book, "Friedel-Crafts and Related Reactions," vol. I, edited by G. A. Olah, Interscience Publishers, New York, 1963.

It is also known that when using red oil catalyst complexes in catalytic hydrocarbon conversion processes, unless special precautions are taken, the equipment, including the main reaction vessel, pumps, valves and the like, becomes badly corroded, thus decreasing its life. Accordingly, one way to minimize undesirable corrosive effects is to use equipment made of special materials of construction, such as Hastelloy steel or glass. However, such expedients are costly, and it is apparent that it would be advantageous economically to be able to use common materials of construction, such as carbon steel.

It has now been found that the corrosion attendant red oil catalytic hydrocarbon conversion processes, such as the alkylation of benzene with appropriate alkyl chloride to produce precursor detergent material, can be inhibited or prevented by carrying out the reaction in the presence of a small amount of water. The presence during reaction of water in about the range 0.4% to 2%, preferably 0.6% to 1.5% by weight, based on red oil, inhibits corrosion to an extent that ordinary materials of construction, such as carbon steel, can be used. Below a water content of about 0.4% substantially no inhibition of corrosion occurs. Above about 2% water, the red oil catalyst is deactivated to an extent as to be substantially ineffective.

The invention will now be illustrated in connection with a commercial operating alkylation plant, more fully described in copending application Serial No. 292,578, filed July 3, 1963. According to this application there is described a two-stage alkylation process for making biologically soft precursor detergent alkylate by reacting under Friedel-Crafts conditions a mixture of $C_9$—$C_{20}$ monochloro alkanes and an aromatic hydrocarbon, such as benzene.

More particularly, to a first alkylation zone, comprising a carbon steel alkylation reactor, there is charged a chlorination mixture obtained by chlorinating appropriate n-parafins, for example, $C_{11}$—$C_{14}$ n-alkanes, to a low chlorine content so as to minimize the formation of polychlorinated materials. A suitable chlorination mixture contains 10 to 50, preferably 15 to 25, mol percent monochloroparaffins and 50 to 90, preferably 75 to 85, mol percent unchlorinated paraffins.

Along with the chlorination product mixture an excess of aromatic hydrocarbon, for example, benzene, is charged to the first alkylation zone, proportions of benzene ranging from about 2 to 25 mols, preferably 5 to 15 mols, for each mol of alkyl chloride being cited as satisfactory.

2

The chlorination product mixture and benzene are contacted in the first alkylation zone at a temperature in the range 100 to 185° F., preferably 150 to 170° F., in the presence of red oil alkylation catalyst produced in a second alkylation zone.

Alkylation is continued until a major proportion of the alkyl chloride is converted, that is, up to an amount of about 90% to 95% and higher, but below 100%, the time of reaction being about 3 to 15 minutes.

After reaction in the first alkylation zone, the reaction product mixture is then treated to remove spent red oil catalyst, as by phase separation.

The red oil-free reaction product mixture, comprising alkylaromatic hydrocarbon, unconverted alkyl chloride, hydrogen chloride, and aromatic hydrocarbon, is passed into a second alkylation zone and there contacted with aluminum metal catalyst at alkylation temperatures for a period of time sufficient to convert substantially all of the alkyl chloride, suitable temperatures and residence times ranging, respectively, from about 100° F. to 185° F., and 0.3 to 15 minutes. Under these conditions the aluminum metal is converted into the red oil complex catalyst mixture.

The effluent from the second alkylation zone is then separated into a red oil alkylation catalyst complex phase and an organic phase comprising alkylaromatic hydrocarbons. The alkylation catalyst complex phase is sent to the first alkylation zone as the alkylation catalyst for the reaction in that zone, the quantity sent to the first alkylation zone being sufficient to replace spent catalyst removed from that zone and to form 5 to 25%, by volume, of the contents of this zone. From the organic alkylaromatic phase, desired alkylaromatic product is recovered.

The second alkylation zone, wherein the red oil alkylation catalyst complex is formed, may comprise a vessel to which all of the aluminum metal, such as turnings, shot or pellets are charged, the vessel being further provided with means for the venting of excess hydrogen chloride. In continuous operation, aluminum metal is fed to the alkylation vessel or tower at a rate of about 0.03 to 0.1 gram atom per gram atom of chlorine in the chlorinated paraffin feed charged to the first alkylation zone. In this zone the alkylation reaction is finished, and in addition red oil catalyst is produced for use in the first alkylation zone.

When operating in a manner as above described, observing the usual precautions of maintaining anhydrous conditions as required in Friedel-Crafts reactions, such as a maximum water content of 0.01%, corrosion as determined by a continuously recording corrosimeter was found to be 300–400 parts per million per year in the carbon steel first stage reactor.

When, however, the present inventive process was applied by separately feeding into the first alkylation zone 0.7 part water per 100 parts of red oil catalyst entering said first alkylation zone, no corrosion was detectable.

As above exemplified, the water was introduced directly into the first alkylation zone. However, the point of water addition is not critical, and the water can be introduced along with the red oil and/or the feed charged to the first alkylation zone.

It was also found that varying the amounts of water below about 0.4% and above about 2%, based on weight of red oil catalyst entering said first alkylation zone, unsatisfactory results were obtained. Thus, at a water concentration below 0.4%, i.e., at 0.2% no improvement as to corrosion was noted. On the other hand, above about 2%, i.e., at about 2.2%, the catalyst became deactivated and the alkylation reaction was slowed.

I claim:

1. In the process of alkylating an aromatic hydrocarbon compound with an alkyl chloride by contacting the hydrocarbon compound and alkyl chloride with preformed red oil alkylation catalyst complex under alkylation conditions, the improvement of inhibiting corrosion, which comprises carrying out the alkylation in the presence of water in an amount within about the range 0.4% to 2%, by weight, based on red oil catalyst.

2. Process according to claim 1, wherein the water is present in an amount within about the range 0.6% to 1.5%, by weight, based on red oil.

3. In a process for alkylating an aromatic hydrocarbon compound with an alkyl chloride having 9 to 20 carbon atoms in the alkyl group to produce detergent alkylate, which process comprises contacting in a first reaction zone the alkyl chloride with the aromatic hydrocarbon compound in the presence of a red oil alkylation catalyst complex at alkylation temperatures for a period of time sufficient to convert a major portion of the alkyl chloride, thereby producing a reaction product mixture comprising red oil catalyst, alkylaromatic hydrocarbon, alkyl chloride, aromatic hydrocarbon compound, and hydrogen chloride, separating the red oil, and passing the red oil-free product into a second reaction zone and therein contacting it with aluminum metal at alkylation temperatures, for a period of time to convert substantially all of the alkyl chloride, separating from the effluent from the second recation zone a red oil alkylation catalyst complex phase and an organic phase comprising alkylaromatic hydrocarbons, passing the red oil alkylation catalyst complex phase into the first reaction zone to supply substantially all of the red oil alkylation catalyst complex used in that zone, and recovering from the organic alkylaromatic phase alkylaromatic hydrocarbon product useful as detergent alkylate, the improvement of preventing corrosion in the first alkylation zone which comprises maintaining water therein in proportions within about the range of 0.4% to 2%, by weight, based on the red oil alkylation catalyst complex contained therein.

4. Process according to claim 3, wherein the proportions of water in the first alkylation zone are within about the range of 0.6 to 1.5%, by weight, based on the red oil alkylation catalyst complex contained therein.

References Cited

UNITED STATES PATENTS

| | | | |
|---|---|---|---|
| 2,403,785 | 7/1946 | Britton et al. | 260—671 |
| 2,419,632 | 4/1947 | Day | 260—671 |
| 2,478,897 | 8/1949 | Corson | 260—671 |
| 2,478,900 | 8/1949 | D'Ouville | 260—671 |
| 2,972,641 | 2/1961 | Herzel et al. | 260—671 |

DELBERT E. GANTZ, *Primary Examiner.*

C. R. DAVIS, *Assistant Examiner.*